(12) United States Patent
Nelson et al.

(10) Patent No.: US 6,752,415 B2
(45) Date of Patent: Jun. 22, 2004

(54) AIRBAG MODULE Z-HEIGHT CONTROL TAB

(75) Inventors: James E. Nelson, East Layton, UT (US); Gary M. Collins, South Weber, UT (US)

(73) Assignee: Autoliv ASP, Inc., Ogden, UT (US)

( * ) Notice: Subject to any disclaimer, the term of this patent is extended or adjusted under 35 U.S.C. 154(b) by 54 days.

(21) Appl. No.: 09/972,287

(22) Filed: Oct. 5, 2001

(65) Prior Publication Data

US 2003/0067143 A1 Apr. 10, 2003

(51) Int. Cl.[7] .......................... B60R 21/16; B60R 21/20
(52) U.S. Cl. .................. 280/728.2; 280/728.3; 280/731
(58) Field of Search .................. 280/731, 732, 280/728.3, 728.2

(56) References Cited

U.S. PATENT DOCUMENTS

| | | | |
|---|---|---|---|
| 5,275,432 A | | 1/1994 | Pray |
| 5,454,586 A | * | 10/1995 | Rogerson ................. 280/728.2 |
| 5,474,323 A | | 12/1995 | Davidson |
| 5,520,411 A | * | 5/1996 | Lang et al. .............. 280/728.3 |
| 5,580,082 A | * | 12/1996 | Shiga et al. ............. 280/728.3 |
| 5,678,850 A | * | 10/1997 | Ricks et al. ............. 280/728.2 |
| 5,704,635 A | * | 1/1998 | Tajiri et al. ............. 280/728.2 |
| 5,794,967 A | | 8/1998 | Manire |
| 5,794,968 A | * | 8/1998 | Yamamoto et al. ...... 280/728.2 |
| 5,829,777 A | * | 11/1998 | Sakurai et al. ........... 280/728.2 |
| 5,851,023 A | * | 12/1998 | Nagata et al. ........... 280/728.3 |
| 5,853,190 A | | 12/1998 | Rion |
| 6,039,342 A | * | 3/2000 | Sasaki ..................... 280/728.3 |
| 6,092,834 A | | 7/2000 | Staub |
| 6,099,027 A | | 8/2000 | Shirk |
| 6,161,865 A | | 12/2000 | Rose |
| 6,173,987 B1 | * | 1/2001 | Terasawa et al. ........ 280/728.2 |
| 6,199,899 B1 | * | 3/2001 | Krebs et al. ............. 280/731 |
| 6,260,876 B1 | | 7/2001 | Froude |
| 6,296,270 B1 | * | 10/2001 | Amamori ................ 280/728.2 |
| 6,299,196 B1 | * | 10/2001 | Suzuki et al. ............ 280/728.2 |
| 6,409,208 B1 | * | 6/2002 | Frisch et al. ............ 280/728.2 |
| 6,422,602 B1 | * | 7/2002 | Ishii et al. ............... 280/743.1 |
| 6,517,099 B2 | * | 2/2003 | Igawa et al. ............ 280/728.2 |

FOREIGN PATENT DOCUMENTS

EP 0 573 145 A1 * 12/1993
EP 1024061 A2 * 8/2000

* cited by examiner

Primary Examiner—Ruth Ilan
(74) Attorney, Agent, or Firm—Sally J. Brown

(57) ABSTRACT

A Z-height control tab maintains the distance between an airbag cover and a reaction housing. The reaction housing and airbag cover interlock to define a Z-height. The Z-height is defined as the distance between the two interlocked members. The Z-height control tab extends from the reaction housing and engages a wall edge of a skirt extending from the airbag cover. This Z-height control tab engagement maintains the Z-height by preventing the airbag cover and the reaction housing from compressing together.

10 Claims, 3 Drawing Sheets

AIRBAG MODULE Z-HEIGHT CONTROL TAB

BACKGROUND OF THE INVENTION

1. The Field of Invention

The present invention relates to an airbag module housing. More specifically, the present invention relates to maintaining a Z-height between two members of an airbag module.

2. The Relevant Technology

In the modern day automobile, the airbag has become as important an automobile safety feature as the seatbelt. Government standards and consumer demands have dramatically increased airbag use throughout the automobile. Airbag deployment occurs when sensors detect an abnormal deceleration in the automobile, triggering an explosive charge that immediately inflates the airbag. The airbag deploys into the automobile cabin, dampening the occupants' acceleration toward any rigid interior components and preventing serious injury or death. The success of airbags has caused automobile manufactures to install airbags in multiple locations throughout the automobile cabin, including the steering wheel, the passenger side dashboard, and the side doors. However, due to size restrictions of these locations, designers must often balance maximum safety with minimum size.

Airbag modules require accurate and consistent placement of each member of the module. Many airbag designs implement similar module members, such as airbags, airbag covers, and reaction housings. A reaction housing and an airbag cover typically mate or interlock to form an airbag storage volume. The airbag storage volume is defined as the volume between the interlocked reaction housing and airbag cover. The airbag is placed in a folded state within the airbag storage volume. The airbag will generally have an inflation opening where the airbag attaches to the reaction housing and the airbag is then positioned within the reaction housing to deploy toward the airbag cover. The airbag cover typically has a front panel that is exposed to the automobile cabin and a skirt that extends from the back surface of the front panel. The skirt provides an opening to mate the reaction housing to the airbag cover. The airbag cover is designed to release the airbag into the automobile cabin upon inflation of the airbag. Airbag covers release airbags from the storage volume and into the passenger compartment by using hinged or pivotal doors to release the airbag or by tear-lines in the front panel of the cover that tear apart when the airbag deploys.

To facilitate deployment of an airbag through the airbag cover and into the automobile cabin, airbag modules typically use the different relative strengths between the reaction housings and the airbag cover. Because the pivotal door or the tear lines in the airbag cover are designed to yield when an airbag deploys, the relative strength of the airbag cover must be smaller than the strength of the reaction housing. Consequently when an airbag expands, the reaction housing acts as a reaction surface from which the expanding airbag may exert an equal and opposite load on the airbag cover. The airbag cover yields to the expanding airbag, allowing the inflated airbag to deploy away from the reaction housing and into the automobile cabin.

Airbag module designs require consistent placement of each module member within the airbag module to maintain a proper airbag storage volume. As previously discussed, the storage volume is defined as the region between the interlocked airbag cover and reaction housing. The critical measurement in the airbag storage volume is the Z-height. The Z-height is the distance between the back surface of the airbag cover and the reaction surface of the reaction housing. The Z-height changes as the reaction housing and the airbag cover move relative to each other. Thus, as the two members are pulled apart, the Z-height increases and as the two members are compressed together, the Z-height decreases. Significant displacement of the defined Z-height can interfere with proper airbag operation. For example, because airbag covers are typically an aesthetic member of the automobile cabin, an incorrect Z-height will prevent the cover from sitting flush with the other interior components. Also, airbag covers on steering wheels are typically connected with the horn. If the Z-height is displaced, it may cause the horn to constantly actuate or to not operate at all. In extreme situations, an improper Z-height displacement can interfere with the deployment of the airbag. This may cause the airbag to deploy incorrectly. Additionally, if a Z-height displacement compromises the coupling between the reaction housing and the airbag cover, a deploying airbag may project the airbag cover toward the automobile passenger.

To maintain a functional Z-height, a mode of fastening the airbag cover to the reaction housing must be carefully selected. The fastener mode should be low cost and easy to assemble. More importantly the fastener mode must maintain a proper Z-height when the reaction housing and airbag cover receive compressive and tensile loads. If an inadequate fastener mode is selected, the coupling between airbag cover and reaction housing may fail, causing the airbag to malfunction. A common type of fastening mode used in airbag modules is an integrally formed fastener. Integrally formed fasteners are manufactured as a part of the module member to which it is associated. Examples of integrally formed fasteners may include snap fits, slot and latches, and hook and windows. These fastener designs are less expensive than traditional fasteners, such as screws, and require significantly less assembly time.

An exemplary embodiment of an interference fastener for an airbag module is the hook and widow design. Hook and widow fasteners are inexpensive to manufacture and are easy to assemble. They are also capable of a wide variety of embodiments. Hook and window fasteners typically comprise a protruding "J" shaped hook on a first mating member and a cutout window on a second mating member. The "J" shaped hook slides through the window and engages an edge of the window with the curved section of the hook. Any tensile load applied to the hook will only serve to anchor the hook further to the window. This fit is ideal for withstanding the large tensile loads induced by an airbag exploding between the reaction housing and the airbag cover.

Unfortunately, a simple hook is not adequate for withstanding compressive loads between the reaction housing and the airbag cover. Compressive loads work against the hook and window design by disengaging the hook from the window's edge. Consequently, designers have added various geometries to the hook to allow for proper maintenance of the Z-height during both tensile and compressive loads. Secondary processes, such as crimping the hooks, have been used to create geometries that can properly maintain the Z-height. These geometries engage other parts of the window or airbag module to maintain the Z-height during compressive loads. However, these secondary processes can add cost to the manufacturing process of an airbag module.

Single shot injection molding processes have been used to create hook geometries that can maintain the Z-height during both tensile and compressive loads while using a single step manufacturing process. Various designs of hook and window fasteners can be manufactured with an injection molding process because of the ability in molding to control the shape of the fastener in three dimensions. The three-dimensional nature of injection molding allows designers to add steps or shelves to a hook that will prevent compression of the Z-height and reduction of the airbag storage volume. Further, the injection molding process may use plastics or metals in the airbag module and fastener designs. The flexibility of injection molding makes it a widely used process in manufacturing airbag modules. However, despite all the discussed advantage of injection molding, molding does not necessarily produce the strongest and least expensive airbag module components.

Manufacturers seeking to produce the highest strength airbag modules at the lowest cost have turned to metal stamping processes to form some of the airbag module components. Stamping involves placing a generally thin sheet of metal over a form and then stamping the sheet into the form, forcing the sheet into the shape of the form. Stamping can create various holes and lips in the sheet of metal in a single-step process. Stamped airbag components provide the high strength and ductility of metal with the cost effectiveness of a single-step manufacturing process. Further, the equipment required for stamping is less expensive than the equipment required for injection molding.

One drawback with current stamping processes in airbag module design is the limitation of only being able to form objects in two dimensions. The single motion stamping process has been unable, thus far, to produce a three-dimensional geometry hook or other adequate structure that can maintain an airbag module Z-height during tensile and compressive loads without secondary manufacturing processes. An airbag module design capable of maintaining a proper Z-height during tensile and compressive loads while also capable of being manufactured by a single-step, stamped metal process would provide superior strength, cost, and operational advantages over similar injection molded or multi-stepped airbag module designs.

Accordingly, a need exists for an airbag module that is capable of substantially maintaining the Z-height of an airbag placement volume in tensile and compressive loads that can also be manufactured by a single-step metal stamping process.

BRIEF SUMMARY

The apparatus of the present invention has been developed in response to the present state of the art, and in particular, in response to the problems and needs in the art that have not yet been fully solved by currently available airbag module designs. Thus, it is an overall objective of the present invention to provide an airbag module that is capable of substantially maintaining the Z-height of an airbag placement volume in tensile and compressive loads that can also be manufactured by a single-step metal stamping process.

To achieve the foregoing objective, and in accordance with the invention as embodied and broadly described herein in the preferred embodiment, an airbag module with a Z-height control tab is provided. According to one configuration, the airbag module may comprise a reaction housing and an airbag cover. The reaction housing further comprises a plurality of mounting projections and the airbag cover comprises a skirt with a plurality of windows corresponding to the mounting projections. The reaction housing and the cover interlock via the mounting projections and the skirt windows to define a Z-height, the internal distance between the reaction housing and the airbag cover. The Z-height is substantially maintained during tensile loads by the mounting projections and the Z-height is substantially maintained during compressive loads by the Z-height control tabs. The mounting projections prevent the Z-height from increasing and the Z-height control tabs prevent the Z-height from decreasing.

In a preferred embodiment the reaction housing is manufactured by a single-step, metal stamping process. The Z-height control tabs are created in a shoulder section of the reaction housing as the housing is stamped into shape, thus integrally forming the tabs into the reaction housing. The Z-height control tabs may also extend from the shoulder portion of the reaction housing at any number of angles, such that the Z-height control tabs engage the top of the skirt in a net to interference fit. This provides a secure fit between the reaction housing and the airbag cover. Alternatively, the Z-height control tabs may be semi-deflectable to facilitate an interference fit with the skirt.

These and other objects, features, and advantages of the present invention will become more fully apparent from the following description and appended claims, or may be learned by the practice of the invention as set forth hereinafter.

BRIEF DESCRIPTION OF THE DRAWINGS

In order that the manner in which the above-recited and other advantages and objects of the invention are obtained will be readily understood, a more particular description of the invention briefly described above will be rendered by reference to specific embodiments thereof which are illustrated in the appended drawings. Understanding that these drawings depict only typical embodiments of the invention and are not therefore to be considered to be limiting of its scope, the invention will be described and explained with additional specificity and detail through the use of the accompanying drawings in which.

DETAILED DESCRIPTION OF THE PREFERRED EMBODIMENT

The presently preferred embodiments of the present invention will be best understood by reference to the drawings, wherein like parts are designated by like numerals throughout. It will be readily understood that the components of the present invention, as generally described and illustrated in the figures herein, could be arranged and designed in a wide variety of different configurations. Thus, the following more detailed description of the embodiments of the apparatus, system, and method of the present invention, as represented in FIGS. 1 through 4, is not intended to limit the scope of the invention, as claimed, but is merely representative of presently preferred embodiments of the invention.

Figure 1:
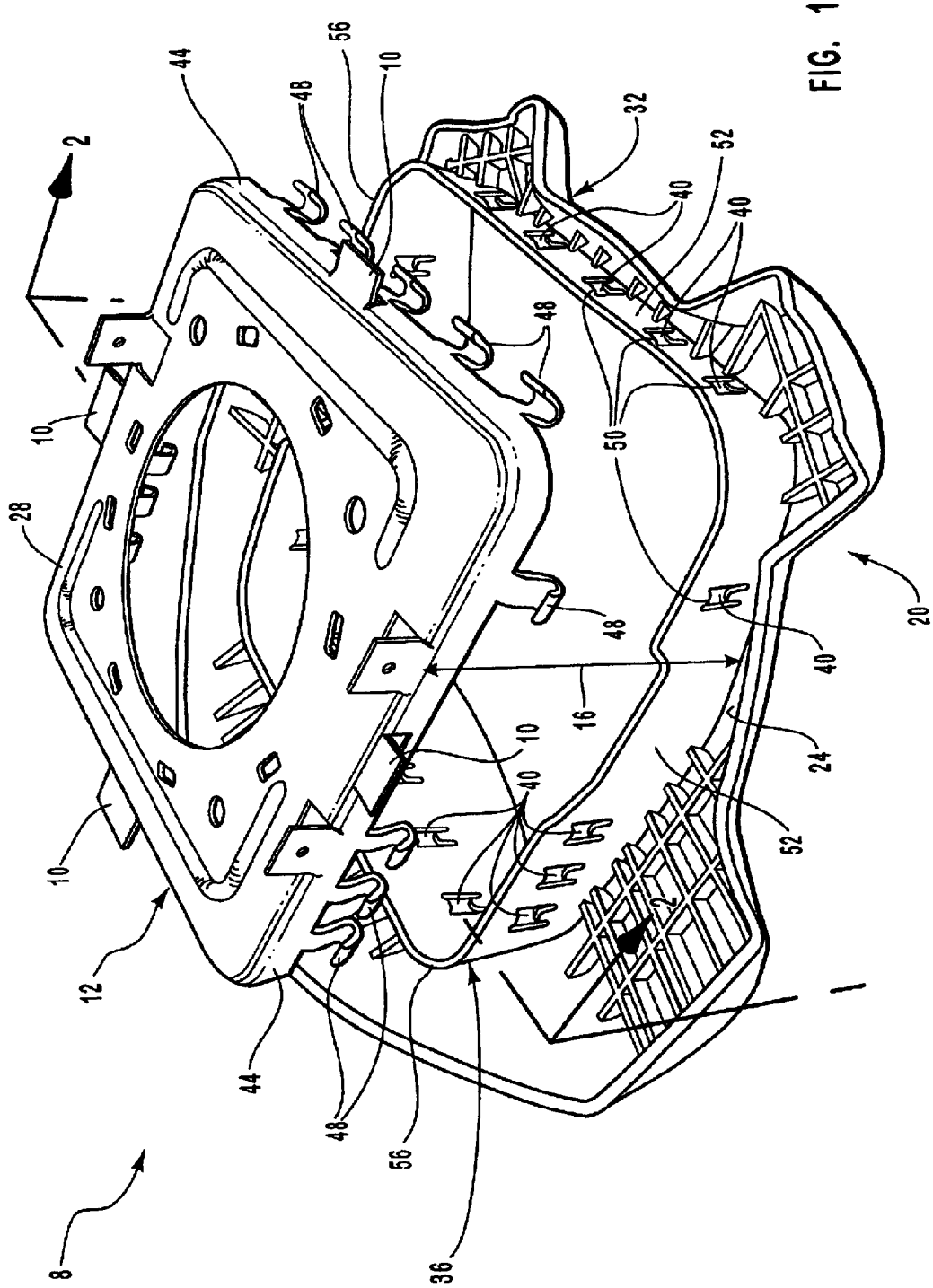
FIG. 1 is a perspective view of a reaction housing with Z-height control tabs and an airbag cover.

FIG. 1 depicts an embodiment of an airbag module 8 with multiple Z-height control tabs 10 extending outwardly from the perimeter of a reaction housing 12. The Z-height control tabs 10, as the name suggests, function as part of a system to maintain the Z-height 16 of an airbag storage volume. The airbag storage volume is the volume between the interlocked reaction housing 12 and the airbag cover 20. The Z-height 16 of the airbag storage volume is defined as the distance from the back surface 24 of the airbag cover 20 to the reaction surface 28 of the reaction housing 12. This distance is critical to proper operation and orientation of the airbag module 8 within the automobile. To properly understand the function of the Z-height control tabs 10, the components of the airbag module 8 and their interaction with each other must be viewed as a whole.

The airbag cover 20 of FIG. 1 has a front panel 32 and a skirt 36. The front panel 32 in the embodiment shown is the member of the airbag module 8 exposed to the interior of the automobile, such as the front panel 32 of the steering wheel, the top of the dashboard, or the side panel of doors. The skirt 36 extends from the back surface 24 of the front panel 32 of the airbag cover 20, creating an area beset by the walls of the skirt 36. The beset area is sized to mate with the reaction housing 12. The walls of the skirt 36 have a plurality of windows 40 with openings through the sides that are positioned to interlock with the reaction housing 12.

The reaction housing 12 comprises a reaction surface 28 with a shoulder portion 44 extending outward from the reaction surface 28. A plurality of mounting members or hooks 48 extend from the shoulder portion 44 of the housing and form a "J" shape near the end of the hooks 48. The hooks 48 are sized to fit through the windows 40 of the skirt 36 and engage the edge of the windows 50 with the "J" shaped sections of the hooks 48. Other shapes of mounting members or hooks 48 may be implemented in the present airbag module 8. The hooks 48 may have an "L" or a "V" shaped end rather than a "J" shaped end. Alternatively, the hooks 48 may be a stud with an enlarged head or similar structure. Multiple other embodiments of the hooks 48 may be employed in the airbag module 8 so long as the hooks 48 engage the windows 40 and maintain the Z-height 16 during a tensile load. Additionally, the hooks 48 do not need to extend from the shoulder portion 44 of the reaction housing 12. One ordinarily skilled in the art will recognize various other locations and methods of coupling the hooks 48 to the reaction housing 12.

The hooks 48 mate with the windows 40 in the skirt 36 as the shoulder portion 44 of the reaction housing 12 is nested into the area beset by the airbag cover skirt 36. To facilitate a tight engagement between the shoulder portion 44 and the skirt 36, the two members must be mateably sized, i.e. substantially the same size. In one embodiment the airbag cover 20 is made of a semi-flexible material to allow the windows 40 in the skirt 36 to flex around the hooks 48. The hooks 48 then slide through the windows 40. The reaction housing 12 and the airbag cover 20 are then pulled apart so that the "J" shaped ends of the hooks 48 lock onto the edge 50 of the skirt windows 40. Once the hooks 48 are fully engaging the window edges 50, the maximum Z-height 16 is set. These hook 48 and window 40 engagements will then substantially maintain the maximum Z-height 16 between the reaction housing 12 and the airbag cover 20 during a tensile load, such as airbag deployment. However, when the reaction housing 12 and the airbag cover 20 encounter a compressive load, the hooks 48 will disengage from the window edge 50, decreasing the Z-height 16. A large enough load can decrease the Z-height 16 until the hooks 48 abut the backside of the front panel 24.

To maintain a minimum Z-height 16 during a compressive load, multiple Z-height control tabs 10 are situated around the perimeter of the reaction housing 12. The Z-height control tabs 10 extend outward from the side of the reaction housing 12, such that they engage the top of the skirt wall 56 when the hooks 48 engage the edge of the windows 50. The tab 10 engagement at the top of the skirt wall 56 determines the minimum height between the back surface 24 of the airbag cover 20 and the reaction surface 28 of the reaction housing 12. This prevents the reaction housing 12 from sinking below the top of the skirt wall 56 during compressive loads on the module 8, such as repeated horn actuation or a passenger striking the airbag cover 20.

Together the Z-height control tabs 10 and the hook 48 and window 40 fasteners function to substantially maintain the Z-height 16 of the airbag storage volume during a wide range of loads exerted on an airbag system. The Z-height 16 is only "substantially" maintained because of flexibility and tolerances inherent in an airbag module 8. In an embodiment where the airbag cover 20 is made of a semi-flexible material, a compressive load on the airbag cover 20 may cause a small degree of elastic bucking in the skirt 36 when the top of the wall is compressed against the Z-height control tab 10. The degree of buckling may depend upon the amount of load placed on the cover, and difference in stiffness between the tabs 10 and the skirt 36. This buckling may cause a temporary decrease in Z-height 16, but the original Z-height 16 will return when the compressive load is removed. Likewise, the hook 48 and window 40 engagements or the tab 10 and skirt 36 engagements may have tolerance variation that creates an area of travel between the "J" shaped hooks 48 fully engaging the edge of the windows 50 and the Z-height control tabs 10 abutting the top of the skirt 36. While tolerance variations allow for some slight change in the Z-height 16, these small allowances in tolerances should not effect the operation of the airbag module 8.

One ordinarily skilled in the art will recognize that the airbag module 8 of FIG. 1 is only illustrative of the possible airbag cover 20 and reaction housing 12 embodiments within the scope of this application. One such alternative embodiment may vary the shape of the reaction housing 12 and airbag cover 20. The reaction housing 12 and the airbag cover 20 of FIG. 1 are shown as being generally square shaped, however the shaped will vary depending upon the placement of the airbag module 8. For example, circular or oval modules may be desirable for steering wheel applications and thin rectangular shaped airbag modules 8 may better serve side door and dashboard airbags. One ordinarily skilled in the art will recognize the wide range of airbag module 8 designs that can implement the Z-height control tabs 10 disclosed herein.

Additionally, another variation of the embodiment of FIG. 1 may reverse the reaction housing 12 and the airbag cover 20. The airbag cover 20 may comprise a plurality of hooks 48 and Z-height control tabs 10 and the reaction housing 12 may comprise a skirt 36 with a plurality of windows 40 corresponding to the hooks 48. The two components would engage in the same manner as the airbag module 8 of FIG. 1. Further, the airbag cover 20 itself may not be an exposed member of the interior of the automobile. The airbag cover 20 may have an aesthetic overlay that is exposed to the interior of the automobile.

Figure 2:
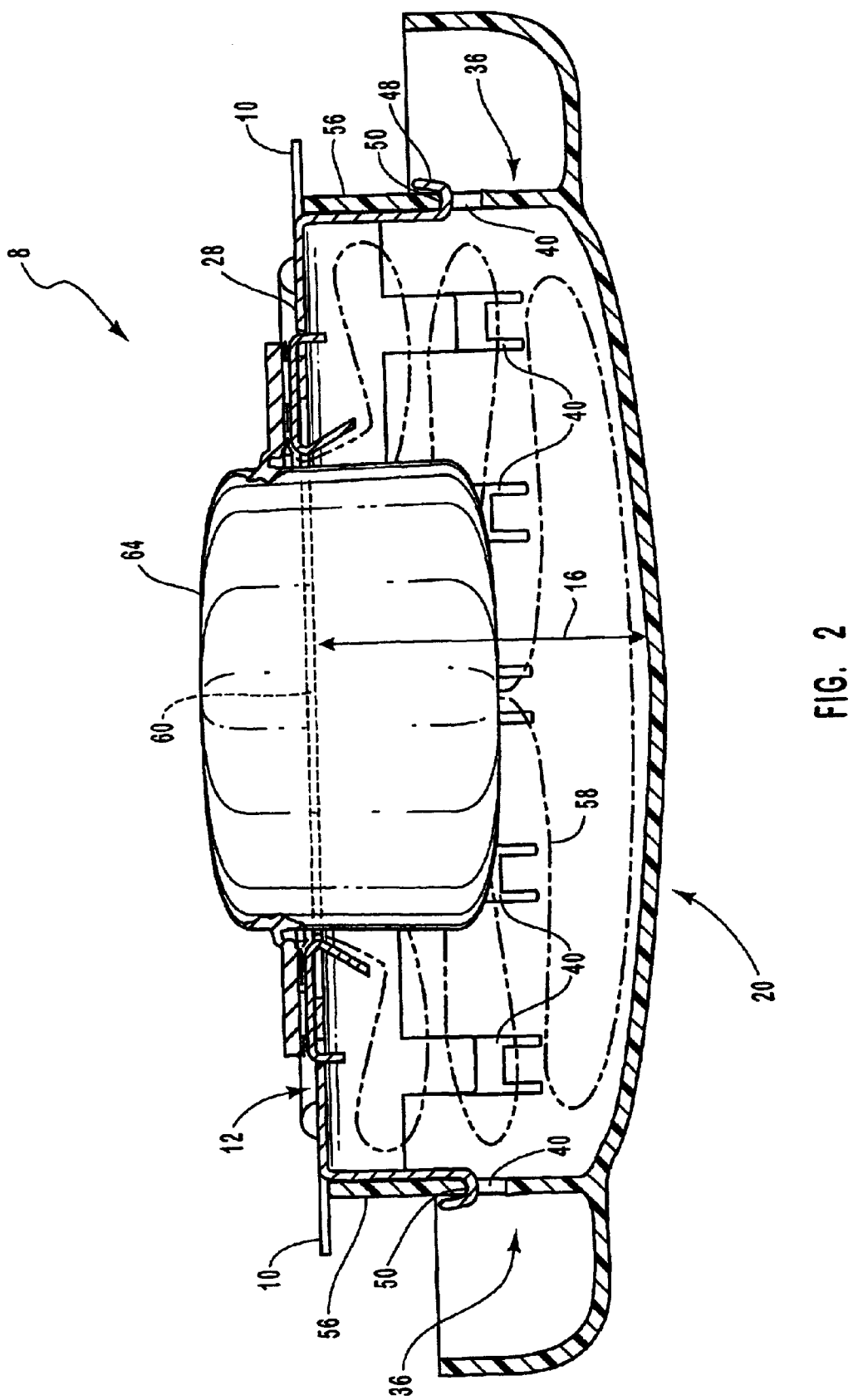
FIG. 2 is a cross-sectional view of the reaction housing coupled to the airbag cover as indicated in FIG. 1.

FIG. 2 depicts a cross-sectional view of the airbag module 8 with the hooks 48 engaging the window edges 50 across sectional line A—A of FIG. 1. This figure also clearly shows the measurement of the Z-height 16 within the airbag storage volume and the placement of the airbag 58 within the storage volume. In the FIG. 2 embodiment, the airbag is connected to the reaction housing 12 at an opening 60 in the airbag which receives an inflating charge 64. Two Z-height control tabs 10 are shown extending perpendicularly from the side of the reaction housing 12 and abutting the top of the skirt wall 56. The skirt 36 and the tabs 10 preferably intersect in a net or interference fit. A net fit exist when the height of the skirt 36 is generally equal to the Z-height 16 of the storage volume, such that the top of the skirt wall 56 touches the Z-height control tabs 10. Also, to create a net fit the hooks 48 must fully engage the edge of the window 50 in the "J" shaped ends. This net fit will limit most movement in the reaction housing 12 and the airbag cover 20 relative to each other.

In an interference fit, the height of the skirt 36 from the edge of the window 50 to the top of the skirt wall 56 is taller than the height of the hook 48 from the concaved section of the "J" hook end 48 to the reaction surface 28. The difference in heights biases the top of the skirt wall 56 against the Z-height control tab 10 when the reaction housing 12 and the airbag cover 20 are engaged. This biasing load produces a slight deflection in the tab 10 or a slight buckling in the skirt 36. The deflection or buckling functions similar to a spring, forcing an engagement between the two members. An interference fit creates a snug fit between the reaction housing 12 and the airbag cover 20, eliminating most variation in the Z-height 16. Incorporating a semi-flexible airbag cover 20 is not only beneficial in eliminating variation in the Z-height 16, but it also eases assembly of the airbag module 8.

In the embodiment of FIG. 2, the width between the ends of the hooks 48 and the width between of the ends of Z-height control tabs 10 are wider than the width of the skirt 36. To allow for the reaction housing 12 to be assembled to the airbag cover 20, one of the two members must be capable of yielding. One embodiment accomplishes this by molding the airbag cover 20 out of a semi-flexible plastic. This will allow the skirt 36 to flex outward, providing a space for the hooks 48 and Z-height control tabs 10 to fit through the inner width of the skirt 36 until the hook 48 slides through the window 40. The reaction housing 12 and the airbag cover 20 are then pulled in a tensile direction to lock the hooks 48 into the window edges 50. This tensile pull also raises the Z-height control tabs 10 above the top of the skirt wall 56, allowing the top of the Z-height control tabs 10 to slide over the top of the skirt wall 56. Additionally, to facilitate assembly it may also be advantageous for the end-to-end width of the Z-height control tabs 10 to be smaller/the end-to-end width of the hooks 48. This can prevent the tabs 10 from getting hung-up on the skirt 36 during assembly.

In the embodiment of FIG. 2, the reaction housing 12, the hooks 48, and the Z-height control tabs 10 are a single piece component. The Z-height control tabs 10 and the hooks 48 are integrally formed out of the reaction housing 12 shoulder portion 44. The housing may be most rapidly and cost effectively manufactured through a metal stamping process. As mentioned above, metal stamping is the process whereby a relatively flat piece of metal is bent and cut into a shape by forcing the sheet of metal into a form with a press. In one step, a stamping process can shape the housing, cut and shape the hooks 48, cut and shape the tabs 10, and create any airbag mounting holes. The stamping process is less expensive that other single-step processes, such as injection molding, but produces a metal reaction housing 12 that is stronger and less time consuming.

Figure 3:
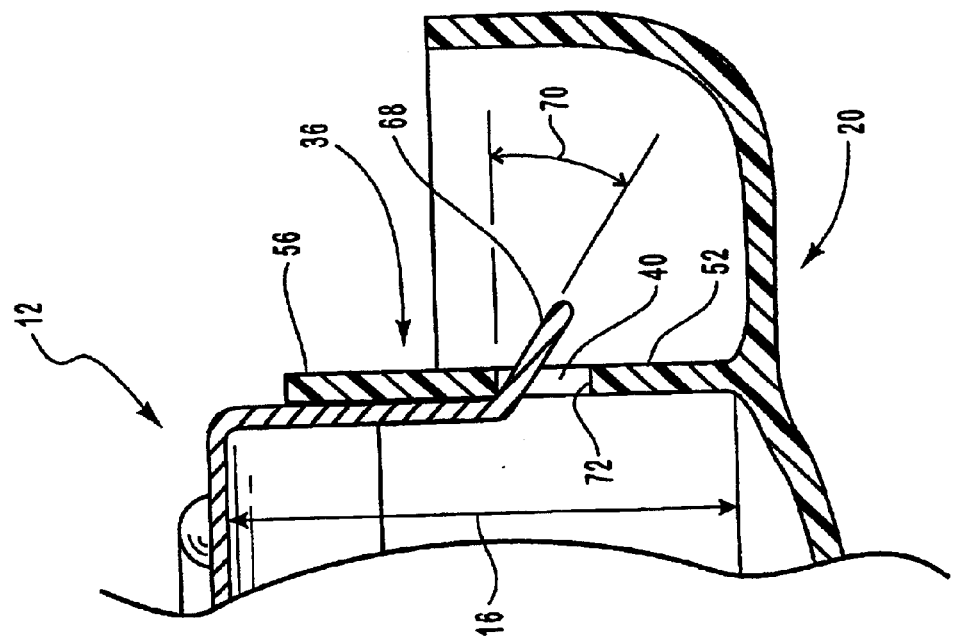
FIG. 3 is a cross-sectional view of an angled Z-height control tab and window engagement.

The stamping process is also capable of simply manufacturing multiple other embodiments of the Z-height control tabs. FIG. 3 depicts an alternative embodiment of these Z-height control tabs 68. In this embodiment, the Z-height control tab 68 shown does not engage the top of the skirt wall 56 as in previously discussed embodiments. Instead, the Z-height control tab 68 engages a window 40 in the skirt 36. The Z-height control tab 68 to the window 40 engagement is different than the engagement of the hook 48 and window 40 fasteners. The hook 48, as shown in FIG. 2, engages the top edge of the window 50, preventing the reaction housing 12 and the airbag cover 20 from being pulled apart. The Z-height control tab 68 of FIG. 3 engages the lower edge 72 of the window 40, preventing the reaction housing 12 and the airbag cover 20 from being compressed together. The tab 68 and window 40 in this embodiment can be placed in multiple locations along the skirt 36. For example, the window 40 may be near the top of the skirt wall 56, so that the window 40 forms a notch in the top of the skirt 36. The Z-height control tab 68 would then engage the bottom of the notch.

FIG. 3 further demonstrates that the Z-height control tab 68 may extend from the reaction housing 12 at an angle 70 above or below a perpendicular extension. The angled tab 68 may be semi-flexible to place a biasing load on the top of the skirt wall 56, creating an interference fit. The flexibility and the angle 70 of the tab 68 may also allow tolerances of the reaction housing 12 and the airbag cover 20 to be looser while still obtaining a secure fit. This is accomplished by angling the Z-height control tab 68 so that even when the window 40 is at its largest tolerance and is positioned at its closest to the top panel, the Z-height control tab 68 will still engage the edge of the window 50. Therefore, if the window 40 is smaller or if its position is closer to the top of the skirt 36, the tab 68 may simply flex to engage the window 40. An angled Z-height control tab 68 also allows for loose tolerances of the skirt 36 height while still maintaining a net or interference fit.

Added advantages may also be obtained by implementing an angled tab, similar to the angled tab 68 depicted in FIG. 3, to the Z-height control tab 10 embodied in FIG. 2. Referring back to FIG. 2, an angled tab 10 allows the hook 48 and Z-height control tab 68 to bracket-in a section of the skirt 36, so that the wall must deform in order to be released from the hook 48 and tab 10 bracket-type engagement. A Z-height control tab may have a wide range of angles to accommodate various airbag module designs. For example, the Z-height control tabs 10 in the FIG. 2 embodiment preferably have a 5° to 10° angle offset from a perpendicular extension from the reaction housing 12. This provides the interference fit and loose tolerance characteristics as discussed above. However, the Z-height control tab may be any angle suitable for the desired function.

Figure 4:
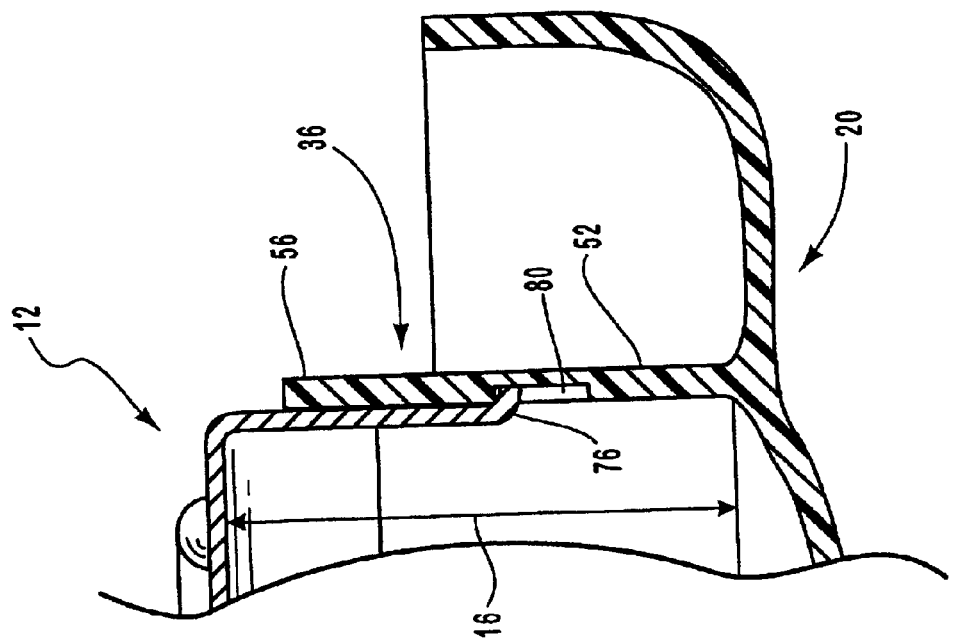
FIG. 4 is a cross-sectional view of a Z-height control tab and recessed window engagement.

FIG. 4 depicts another embodiment of a Z-height control tabs 76. In this embodiment, the window in the skirt 36 is a recess 80 in the interior wall of the skirt 36 instead of a through window. The Z-height control tab 76 in this embodiment engages the edge of the recess 80 to maintain the Z-height 16. This recess 80 and tab 76 system may also have an angled tab and an angled recess edge to ensure the tab does not slip off of the edge of the skirt 36. Additionally, while the recess 80 shown in FIG. 4 is relatively long compared to the thickness of the Z-height control tab 76, the recess 80 or window 40 does not need to be significantly larger than the thickness of the Z-height control tab 76. The recess 80 may be the same size as the tab 76, or the recess 80 may be smaller than the tab 76, creating an interference fit. The shape of the Z-height control tabs 76 may also vary depending upon the different embodiments. While the figures have shown the Z-height control tabs 76 as being rectangular shaped, the tabs 76 may take any shape sufficient to maintain the Z-height 16. Rounded or chamfered tab designs may be selected to prevent the tabs 76 from catching when assembled. One ordinarily skilled in the art will recognize that a multiple number of Z-height control tab 76 shapes exist that allow for adequate Z-height 16 maintenance.

As it has been demonstrated, the implementation of Z-height control tabs on a reaction housing will maintain a proper Z-height of an airbag module. Thus, the Z-height can be sufficiently maintained during compressive loads with no added cost to the manufacturing process. Additionally, various embodiments of the Z-height control tabs will allow for looser tolerances in the airbag module and a more secure fit between the reaction housing and the airbag cover.

The present invention may be embodied in other specific forms without departing from its structures, methods, or other essential characteristics as broadly described herein and claimed hereinafter. The described embodiments are to be considered in all respects only as illustrative, and not restrictive. The scope of the invention is, therefore, indicated by the appended claims, rather than by the foregoing description. All changes that come within the meaning and range of equivalency of the claims are to be embraced within their scope.

What is claimed and desired to be secured by United States Letters Patent is:

1. An airbag module, comprising:
   a reaction housing comprising a plurality of mounting projections, a reaction surface, and
   at least one Z-height control tab; and
   a cover comprising a skirt with a plurality of windows corresponding to the mounting projections, the mounting projections engaging the windows to define a Z-height and the Z-height control tab engaging a top edge of the skirt to substantially maintain the defined Z-height, wherein the Z-height control tab is aligned generally parallel to a plane extending across the reaction surface.

2. The airbag module in claim 1 wherein the reaction housing is made of stamped metal.

3. The airbag module in claim 1 wherein the Z-height control tab engages the skirt at an angle sufficient to prevent substantial Z-height movement.

4. The airbag module in claim 1 wherein the Z-height control tab engages the skirt generally perpendicularly to the skirt.

5. The airbag module in claim 1 wherein the Z-height control tab is capable of buckling.

6. The airbag module in claim 1 wherein the Z-height control tab engages the skirt in a net fit.

7. The airbag module in claim 1 wherein the Z-height control tab is integrally formed in the reaction housing.

8. The airbag module in claim 1 wherein the reaction housing comprising the Z-height control tab has a perimeter edge and the Z-height control tab projects outward from the perimeter edge to engage the skirt.

9. The airbag module in claim 1 wherein the reaction housing has a shoulder and the Z-height control tab is formed from stamping out a section of the shoulder.

10. An airbag reaction housing comprising:
    a cover having a skirt and a front panel with a plurality of windows; and
    a metal-stamped reaction housing having a reaction surface and a plurality of integrally formed mounting projections, the mounting projections engaging the windows to substantially maintain a Z-height in a tensile direction, the reaction housing further comprising at least one integrally formed Z-height control tab engaging a top edge of the skirt to substantially maintain the Z-height in a compressive direction, wherein the Z-height control tab is aligned generally parallel to a plane extending across the reaction surface.

* * * * *